Figure 1:
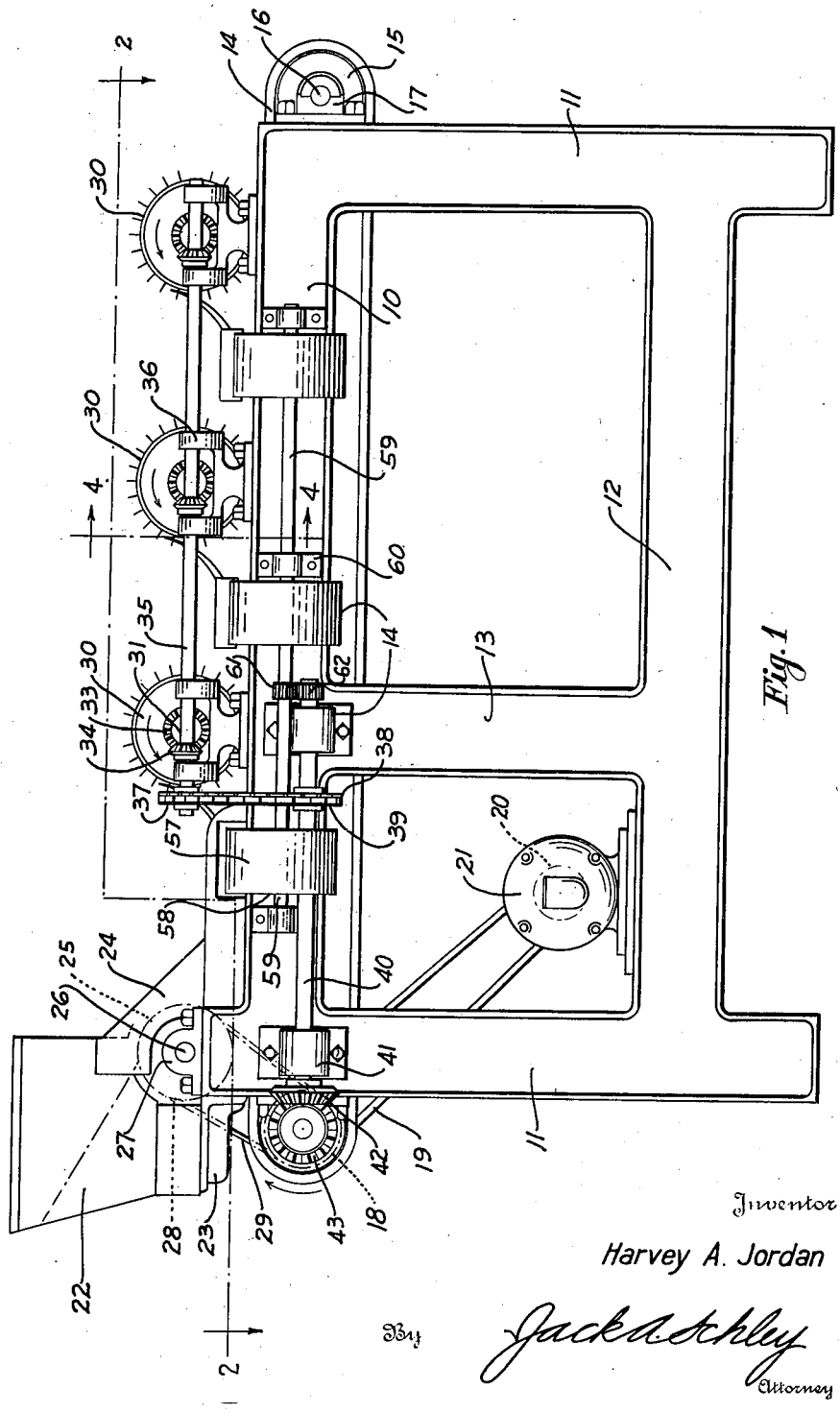

June 24, 1941.  H. A. JORDAN  2,246,851
SEPARATING DEVICE
Filed March 10, 1939   4 Sheets-Sheet 2

Inventor
Harvey A. Jordan
By Jack Ashley
Attorney

June 24, 1941.  H. A. JORDAN  2,246,851
SEPARATING DEVICE
Filed March 10, 1939  4 Sheets-Sheet 3

Inventor
Harvey A. Jordan
By Jack A. Athley
Attorney

Inventor
Harvey A. Jordan
By Jack A. Ashley
Attorney

Patented June 24, 1941

2,246,851

UNITED STATES PATENT OFFICE 2,246,851

SEPARATING DEVICE

Harvey A. Jordan, San Antonio, Tex.

Application March 10, 1939, Serial No. 260,926

7 Claims. (Cl. 209—109)

This invention relates to new and useful improvements in separating devices.

One object of the invention is to provide an improved device for efficiently separating the broken shells from the meat of nuts, whereby such separation may be accomplished in a minimum length of time and without manual labor.

An important object of the invention is to provide an improved separating device wherein the broken shells and meats are conducted beneath separating rollers or drums which are constructed so as to pick up the meats without picking up the shells, whereby the meats may be subsequently removed from the drum and retained, while the shells may be suitably disposed of in any desired manner.

A particular object of the invention is to provide an improved separator having a rotatable drum provided with depressible pins or teeth, which are normally held in an outer or extended position by a resilient means, whereby they may pass over the broken shells and meat; the pins being arranged to penetrate the relatively soft meat to pick up the same but being constructed so as to be depressed when contacting the relatively hard shells, whereby only the nut meat is picked up by said teeth.

Another object of the invention is to provide an improved roller for a separating device wherein a plurality of sharpened pins are slidably mounted in the wall of the drum with their outer ends projecting radially from the drum surface, together with improved resilient means within said drum for normally holding the pins extended; said resilient means having sufficient strength to maintain the pins extended when said pins contact the relatively soft nut meat, whereby said meat is penetrated, but being arranged to flex sufficiently to permit the pins to retract or move inwardly when said pins contact the shell to prevent the pins penetrating said shell.

A further object of the invention is to provide an improved separating device, of the character described, wherein the broken shells and the meat of the nuts are conducted beneath a plurality of separating rollers which extend transversely of the conveyor so that all of the shells and meat thereon are contacted by the rollers to assure that no particles escape separation; the device also including automatic stripper means for removing the nut meats from the rollers and a belt conveyor for conveying the separated meats to a desired disposition.

Still another object of the invention is to provide an improved separating device, of the character described, wherein the drums, conveyors, discharge hopper, and other movable parts are driven from a single prime mover, whereby manufacturing and operating costs are minimized.

A construction designed to carry out the invention will be hereinafter described, together with other features of the invention.

Figure 2:
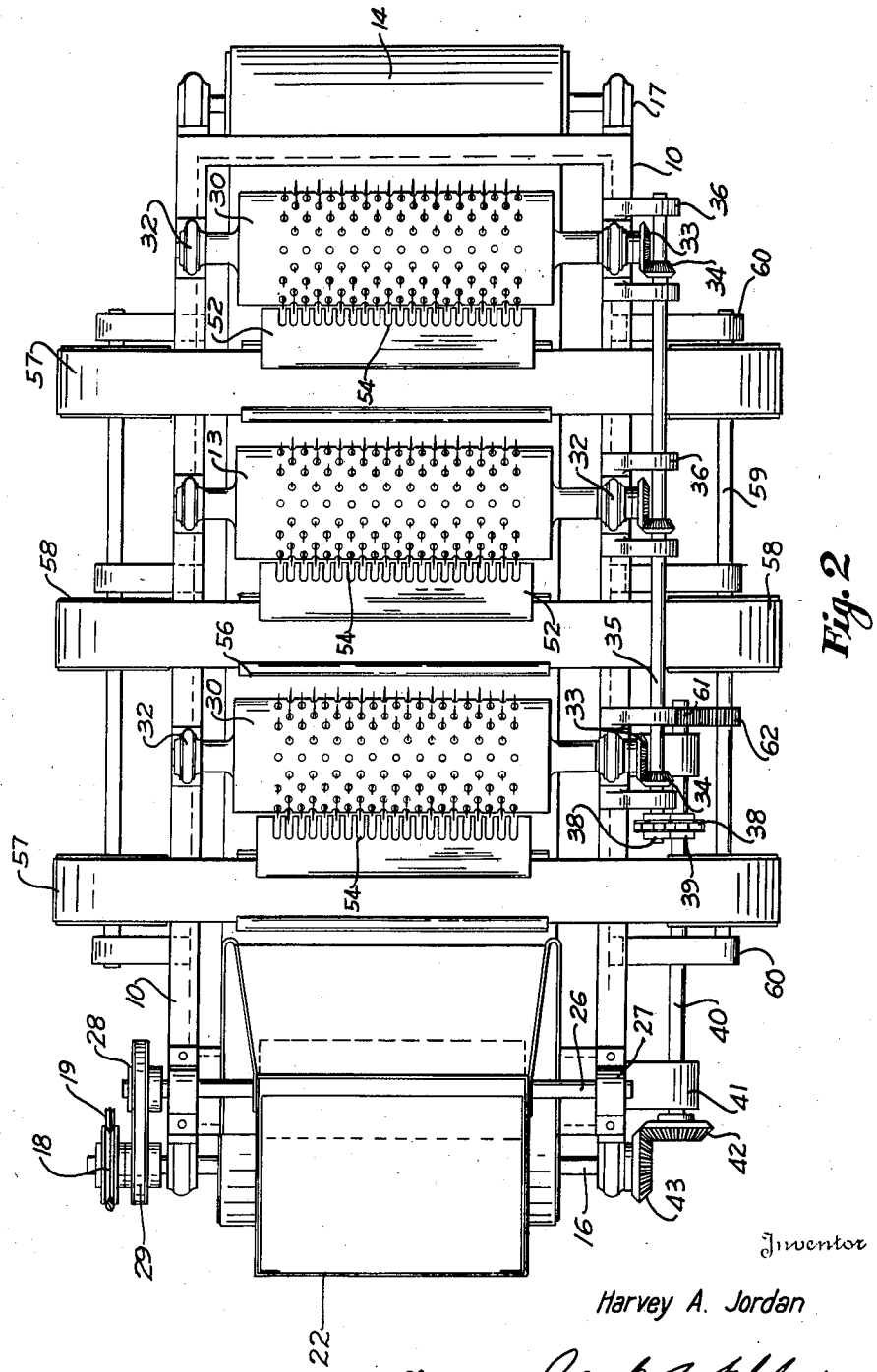
Figure 3:
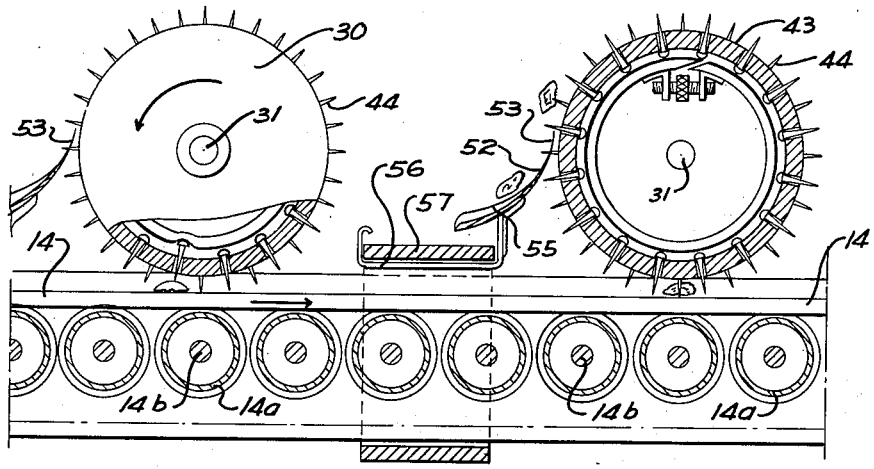
Figure 4:
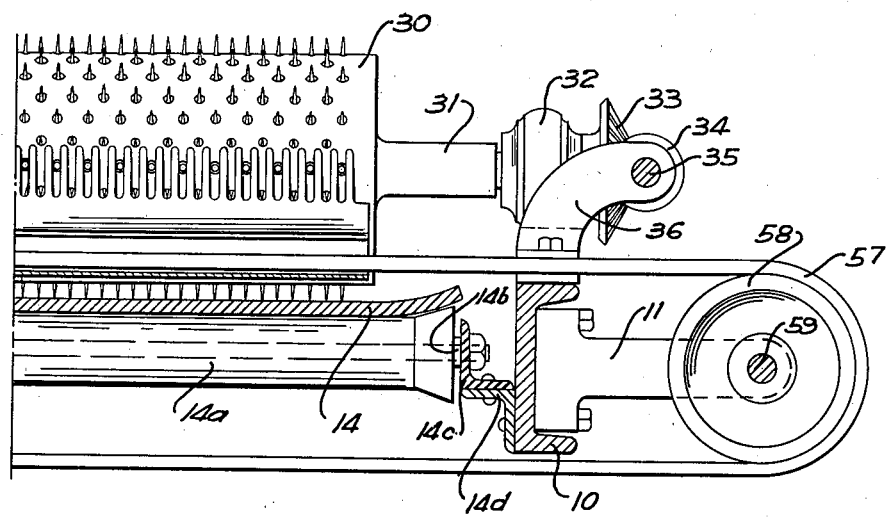
Figure 5:
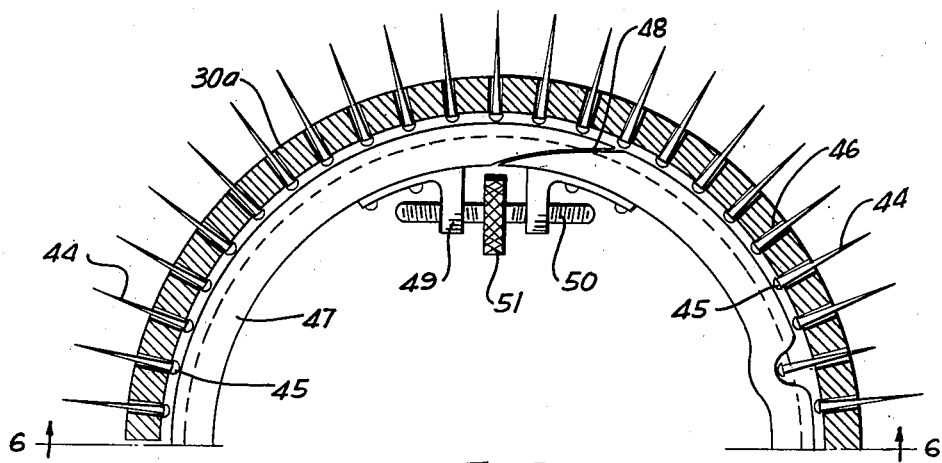
Figure 6:
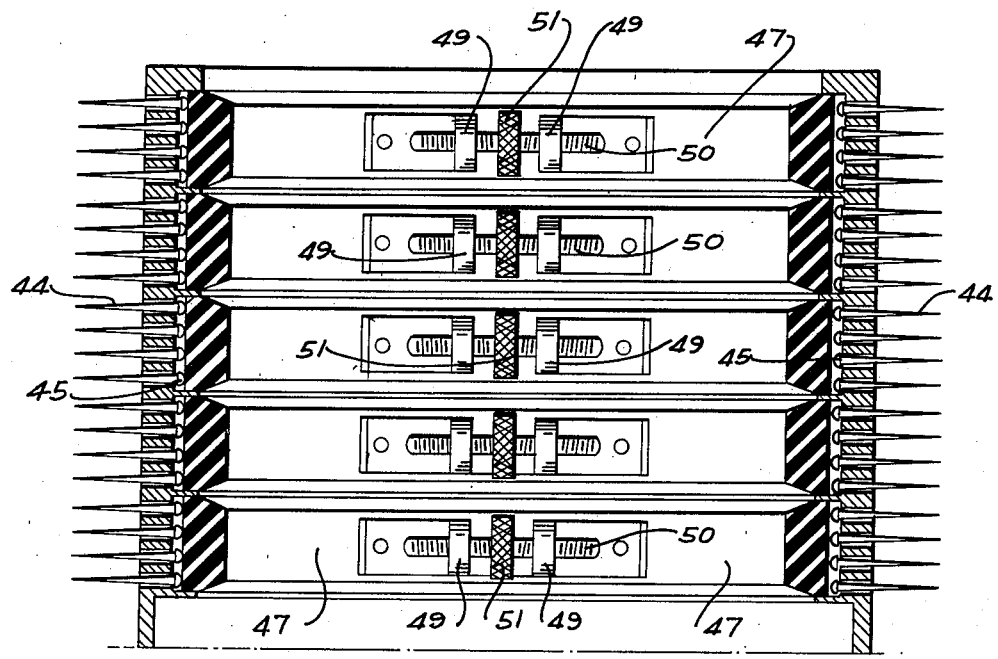

The invention will be more readily understood from a reading of the following specification and by reference to the accompanying drawings, in which an example of the invention is shown, and wherein:

Figure 1 is a side elevation of an improved separating device, constructed in accordance with the invention, Figure 2 is a plan view, taken on the line 2—2 of Figure 1, Figure 3 is a partial longitudinal, sectional view and illustrating two of the separating drums, Figure 4 is an enlarged partial, vertical, sectional view taken on the line 4—4 of Figure 1, Figure 5 is an enlarged partial, sectional view of one of the drums, and Figure 6 is a transverse, vertical, sectional view, taken on the line 6—6 of Figure 5.

In the drawings, the numeral 10 designates the longitudinally extending side members of a frame or stand. The side members are provided with depending supporting legs 11 at their extremities and the lower portion of the legs are braced by a longitudinal bracing member 12. The bracing member 12 is connected to the side member or frame 10 by a vertical bar 13. It is preferable that the elements of the stand be formed integral with each other, as is clearly shown in Figure 1. Mounted between the longitudinal frame members 10 is a longitudinally extending conveyor belt 14. This endless belt passes over pulleys 15, which are mounted on transverse shafts 16. Each pulley 15 is mounted in the same manner and has the ends of its shaft supported in suitable bearing collars 17 which are bolted or otherwise secured to the frame 10. It is pointed out that the pulleys are located nearer the upper end of the stand, whereby the endless conveyor belt travels in a plane in substantial alinement with the upper portion of the stand (Figure 1). When the pulleys 15 are rotated, it is manifest that a longitudinal movement will be imparted to the endless conveyor belt 14.

The intermediate portion of the conveyor belt between the pulleys 15 is supported by a plurality of transverse rollers 14a which have pivot studs 14b at their ends (Figure 4). The studs are journaled in angular brackets 14c which are secured to an angle member 14d mounted on the inner side of the longitudinal frame bars 10. The ends of the rollers 14a are flared outwardly so that the longitudinal edge portions of the conveyor 14 are inclined upwardly to prevent particles thereon from falling from the conveyor during its longitudinal travel.

For driving the endless conveyor belt 14, one of the pulleys 15 has a drive pulley 18 secured to its shaft. An endless drive belt 19 passes over the drive pulley 18 and also over the drive wheel 20 of a suitable electric motor 21. When the motor is operating, it will be manifest that a rotation will be imparted to the drive pulley 18 through the belt 19, whereby a rotation is imparted to the shaft 16 to rotate the conveyor pulley 15. In this manner, the conveyor 14 travels longitudinally within the frame between the side members thereof. It is pointed out that the conveyor belt is driven in the direction of the arrows in Figure 1, as the pulley 15 is rotated in a clockwise direction in this figure.

A suitable hopper 22 for receiving the cracked nuts to be worked upon is secured to the frame 10 at one end thereof, said hopper being mounted on a suitable bracket or support 23. The hopper is mounted at that end of the frame on which the drive pulley 18 is located and said hopper is formed with a suitable discharge spout 24 which has its lower end disposed contiguous or adjacent to the upper surface of the conveyor belt 14. A rotatable dropper 25 is mounted within the discharge spout for feeding or dropping the cracked nuts from the hopper onto the conveyor. This dropper is mounted on a suitable shaft 26 which extends transversely of the discharge spout and has its ends supported in bearings 27 which are bolted to the top of the frame 10. One end of the shaft 26 has a drive pulley 28 secured thereto and a drive belt 29 passes over this pulley and also over the pulley 18, whereby when the latter drive pulley is rotated to impart movement to the conveyor 14, a rotation is imparted to the dropper 25. Thus, it will be manifest that the cracked nuts which are to have their shells separated from the meat are introduced into the hopper 22. These broken or cracked nuts are fed onto the conveyor belt which is moving in a direction toward the right in Figure 1.

A plurality of drums or rollers 30 are mounted in spaced relation above the conveyor belt 14. Each drum is constructed in exactly the same manner and is mounted on a transverse shaft 31 which has its ends supported in a suitable bearing collar 32 which is secured to the top of the frame bar 10 (Figure 4). One end of each shaft 31 projects through the bearing collar 32 and has a pinion 33 secured thereto. This pinion is in constant mesh with a drive pinion 34, which is mounted on a longitudinal drive shaft 35 which extends parallel to and above the frame bar 10. As is clearly shown in Figure 1, the drive shaft 35 is supported in a plurality of bearing elements 36 which are bolted to the frame. One end of the drive shaft is provided with a drive sprocket 37 which has an endless drive chain 38 passing thereover.

The drive chain also passes over a sprocket 39 which is secured to a jack shaft 40, which shaft is journaled in suitable bearing brackets 41 which are bolted to the side of the frame 10. It is pointed out that the sprocket 39 is located intermediate the ends of the jack shaft. As is clearly shown in Figure 1, one end of the jack shaft terminates adjacent the driving pulley 15 for the conveyor belt and this end of the shaft is provided with a suitable bevelled gear or pinion 42. This pinion is in constant engagement with a complementary pinion or bevelled gear 43 which is secured to the shaft 16 of the pulley 15. It is pointed out that the pinion 43 is fastened to the shaft at the end opposite that at which the drive pulley 18 is secured thereto.

With the above arrangement, it will be seen that when the electric motor 21 is operating to impart longitudinal movement to the conveyor belt 14 and to operate the dropper 25 in the discharge spout of the hopper 22, as has been explained, the jack shaft 40 will also be rotated through the medium of the pinions 42 and 43. Rotation of the jack shaft will, of course, rotate the sprockets 39 and 37 through the drive chain 38. Rotation of the sprocket 37 imparts a similar rotation to the drive shaft 35 which, in turn, rotates the drums 30 through the pinions 33 and 34. Therefore, as the belt or conveyor 14 moves longitudinally between the frame bars 10, the drums 30 above said conveyor are rotated at the same time. It is noted that the gearing is such that the drums rotate in a counterclockwise direction, whereby their lower ends which are contiguous to the conveyor belt move in the same direction as said belt (Figure 3).

The drums or rollers 30 are all constructed in the same manner and it is believed that a description of one will suffice. Each roller includes a cylindrical shell or housing 30a which is provided with a plurality of staggered pins 44 which project outwardly from the periphery thereof. As is clearly shown in Figures 4, 5 and 6, the pins are arranged in staggered relation throughout the surface of the drum. Each row of pins is staggered relative to the adjacent rows, whereby it is impossible for any of the particles on the conveyor belt 14 to pass beneath the roller without being contacted by one of the pins. Each pin is preferably elongate and tapered to a sharp point at its outer end, while its inner end is formed with a head 45, each pin extends through a radial opening 46 which is formed within the shell 30a and the heads 45 of said pins limit the outer movement or prevent outward displacement of said pins.

For normally retaining the pins in their extended or outwardly projecting position, as shown in Figure 5, a plurality of elastic retaining rings 47 are located within the shell 30a. The number of rings provided may vary and, as illustrated in Figure 6, five rings are employed, said rings covering the entire inner surface of the shell. In this manner, one ring serves to retain several rows of the pins in their outwardly extended position. Each ring is split along a diagonal line, whereby the ends 48 of said ring may overlap each other. The overlapping ends of the ring are formed with brackets 49 which are secured thereto and which extend inwardly from the inner periphery of the ring. The brackets are connected together by a screw 50 which is provided with opposite threads at opposite ends; that is, one end of the screw 50 is provided with righthand threads, while the opposite end is provided with left-hand threads. A knurled nut 51 is secured to the central portion of the screw, whereby said screw may be readily manipulated by the operator. When the screw is rotated in one direction, it will be obvious that the brackets or lugs 49 will be moved outwardly away from each other, whereby the external diameter of the elastic ring 47 is increased and is pressed into tighter engagement with the heads 45 of the pins 44. When this occurs, it will be evident that a greater force must be exerted on the outer ends of said pins before said pins will move inwardly against the elastic ring. Similarly, when the nut 51 and screw 50 are rotated in an opposite direction, the outer diameter of the elastic ring 47 is reduced, with the result that less tension is placed against the heads 45 of the pins. Therefore, less force need be applied to the outer ends of the pins in order to move the same inwardly. From the above, it will be seen that the rings 47 control the amount of force necessary to depress or move the pins inwardly and, by properly adjusting the screw 50 to adjust the tension of the rings 47 against said pins, a positive and accurate control of the force necessary to depress the pins is had.

The cracked nuts which have their shells broken in any suitable manner are introduced into the hopper 22 and are fed therefrom onto the conveyor belt 14. Since the longitudinal edge portions of the belt are inclined upwardly by the supporting rollers 14a, the particles which consists of the broken shells and the meat of the nuts are carried longitudinally of the frame by the conveyor. These particles will pass beneath the first roller or drum 30 and since the sharpened pins 44 operate in close proximity to the conveyor belt 14, said particles are contacted by said pins. As previously explained, the pins are arranged in staggered relation so as to cover substantially the entire cross-sectional area of the belt 14, whereby each particle must pass beneath the drum. As the pins on the rotating drum contact the meat of the nuts on the conveyor belt 14, said pins will penetrate the relatively soft meat and will pick up said meat from the conveyor. The resiliency or force exerted by the elastic rings 47 is sufficient to resist an inward movement of the pins when the same contact the relatively soft meat and, therefore, said pins penetrate the meat to remove the same from the conveyor. When the pins contact the broken shells which are travelling along the conveyor, said shells, being relatively hard, resist penetration by the pins. The resiliency or elasticity of the rings 47 is such that the hard shells will cause the pins, contacting the same to be depressed or moved inwardly, such inward movement being permitted by the distortion of the rings 47. Therefore, since the pins may move inwardly when contacting a hard surface or material, such as the shells, said pins will not penetrate the shells and will not pick up said shells to remove the same from the conveyor. Therefore, the shells will continue their travel along the conveyor while the meat will be picked up by the pins.

The first roller or drum 30 will pick up a portion of the meat and may not remove all of said meat from the conveyor belt. However, the particles continue their travel and are moved successively beneath the remaining rollers or drums 30 and by the time said particles have passed beneath the last drum, substantially all of the meat has been removed from the conveyor and only shells remain thereon. A suitable hopper or container may be located at the end of the conveyor, whereby said shells may drop thereinto for suitable disposition.

The meats which are penetrated and picked up by the pins 44 are carried around each drum in a counter-clockwise direction. For removing the meats from the pins of each drum, an elongate stripper bar 52 is located adjacent each roller or drum. This bar extends longitudinally throughout the length of said drum and has its upper end reduced or tapered to a fine edge as shown at 53. The upper portion of the stripper bar is notched as at 54 so that it may pass between the extending pins 44 (Figure 4). The stripper bar 52 is carried by an angular bracket 55 which is secured to a transversely extending plate 56, said plate having its ends suitably secured to the side members of the frame 10. An endless belt 57 extends over the plate 56 and is located immediately below the stripper bar 52. This belt extends transversely of the frame 10 and passes over pulleys 58 which are mounted on a shaft 59. The shaft is supported in suitable bearings 60 which are fastened to the outer side of the frame 10 (Figure 1).

For driving one of the shafts 59, said shaft is formed with a gear 62, which gear meshes with a complementary gear 61, the latter being mounted on the end of the jack shaft 40. With this arrangement, it will be seen that when the jack shaft 40 is driven to drive the drums 30, as has been explained, said shaft also rotates the shaft 59 and pulleys 58 mounted thereon, through the medium of the gears 61 and 62. Rotation of the pulleys 58 will cause the endless belt 57 to move transversely of the frame below the stripper bar 52.

The operation of the device is obvious. When the motor 21 is operated, the endless conveyor 14 is moved longitudinally of the frame 10. At the same time, the dropper 25 in the lower end of the hopper 22 is rotated through the medium of the drive pulley 13 and belt 29. When the pulley shaft 16, which drives the conveyor 14, is rotated, a rotation is imparted to the jack shaft 40, whereby the drums 30 are rotated in a counter-clockwise direction by means of the chain 38 and the pinions 33 and 34. At the same time, rotation of the jack shaft imparts a rotation to the pulleys 58 which impart a transverse movement to the conveyor belt 57. Therefore, all of the moving parts of the device are operated from the single prime mover or motor 21.

The nuts are first broken or cracked and the broken shells and meat are introduced into the hopper 22. The dropper 25 feeds these particles under the conveyor 14 which carries said particles beneath the drums 30. As the particles move beneath the drums, the sharpened pins 44 thereof contact said particles and these pins penetrate the relatively soft meat on the conveyor belt. As explained, the elastic rings 47 within each drum exert a sufficient outward force against the pins to prevent said pins from being depressed as they engage the relatively soft meat. Therefore, the meats are penetrated and carried around the drums. The shells of the nuts are sufficiently hard that when contacted by the outer ends of the pins, the pins are depressed or moved inwardly, such inward movement being permitted by the resiliency or elasticity of the rings 47. Therefore, the pins will not penetrate the relatively hard shells with the result that the shells will be carried thereby and will not be picked up by the drums.

The meats which are penetrated and picked up by the pins 44 are carried around the drum and are removed from the pins by means of the stripper bars 52. As the meats are removed from said pins, they fall downwardly along the inclined surface of the bar 52 and drop onto the conveyor belt 57 which is moving transversely within the frame. These belts carry the meats to a suitable container or receptacle (not shown) which may be located at the ends of said drums.

From the foregoing, it will be seen that an efficient device for separating the meat from the shells of nuts is provided. The rollers or drums having the depressible pins are an important feature of the invention for, obviously, said pins provide an efficient means for picking up the meats without the shells. The amount of force which must be applied to the outer ends of the pins in order to depress said pins may be readily controlled by properly adjusting the elastic rings 47 through the adjusting screw 50. The pins may thus be arranged to pick up any selected material of a predetermined hardness. All of the movable parts of the device are driven from the one motor, which makes for economy, not only in manufacture but also in operation.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. A separating device for separating the broken shells from the meats of nuts including, a support, a travelling conveyor mounted in the support and adapted to receive the shells and nuts to be separated, a plurality of rotatable drums immediately above the conveyor and extending transversely thereof, each drum comprising a shell having a plurality of radially extending openings therein, a plurality of pins slidable in said openings, a plurality of elastic rings within the shell engaging the inner ends of the pins to normally hold said pins in an extended position, and means for adjusting the rings to vary the force which said rings exert against the pins to vary the force necessary to depress said pins inwardly of the shell.

2. As a sub-combination in a separating device, a rotatable drum including, a cylindrical shell, a plurality of depressible radially extending pins mounted in said shell, a plurality of elastic rings within the shell acting against the inner ends of the pins for normally holding the pins in an extended position, and means for varying the force exerted by said resilient means to vary the force necessary to depress the pins.

3. A separating device including, a support, a plurality of transversely extending drums rotatably mounted in the support, a plurality of depressible pins extending radially from the outer surface of each drum, a plurality of elastic rings within the shell for maintaining the pins in their extended position, means for varying the tension on more than one pin at the same time whereby various hardness of meats may be penetrated, and a travelling conveyor immediately below the drums in close proximity therewith for conveying the broken shells and meats of nuts beneath the drums and into contact with the pins thereof.

4. A separating device including, a support, an elongate conveyor mounted on the support for conveying the broken shells and the meats of nuts, a plurality of rotatable drums above the conveyor having radially extending pins arranged to penetrate the meats to pick up said meats from said conveyor, a stripper adjacent each drum for removing the meats from the pins of said drum, a discharge conveyor for receiving the removed meats and conducting the same from the drums, a prime mover, means for driving the conveyors and drums from the single prime mover, a plurality of elastic rings for maintaining the pins in an extended position, and means for expanding and contracting said elastic rings whereby the tension exerted on the pins is varied.

5. A separating device including, a support, an elongate conveyor mounted on the support for conveying the broken shells and the meats of nuts, a plurality of rotatable drums above the conveyor having radially extending pins arranged to penetrate the meats to pick up said meats from said conveyor, a stripper adjacent each drum for removing the meats from the pins of said drum, a discharge conveyor for receiving the removed meats and conducting the same from the drums, a plurality of elastic rings for maintaining the pins in their extended position, and means for expanding and contracting said elastic rings whereby the tension exerted on the pins is varied.

6. A separating device including, a support, a plurality of transversely extending drums rotatably mounted in the support, a plurality of depressible pins extending radially from the outer surface of each drum, a travelling conveyor beneath the drums, means for discharging the broken shells and meats of nuts onto the conveyor, whereby said shells and meats are passed beneath the drums and are contacted by the pins thereof so that said pins may penetrate the meats to pick up the same without picking up the shells, a plurality of elastic rings for maintaining the pins in an extended position, and means for expanding and contracting said elastic rings whereby the tension exerted on the pins is varied.

7. A separating device including, a support, a plurality of transversely extending drums rotatably mounted in the support, a plurality of depressible pins extending radially from the outer surface of each drum, a plurality of elastic rings for maintaining the pins in their extended position, a travelling conveyor immediately below the drums and in close proximity therewith for conveying the broken shells and meats of nuts beneath the drums and into contact with the pins thereof, said elastic rings being arranged to resist depression of said pins when the pins contact the relatively soft meats whereby said meats are penetrated and picked up by the pins and being sufficiently resilient to allow inward movement of said pins when the pins engage the relatively hard shells of the nuts whereby said shells are not removed from the conveyor, and means for expanding and contracting said elastic rings whereby the tension on the pins is varied.

HARVEY A. JORDAN.